(12) United States Patent
Michel et al.

(10) Patent No.: US 7,273,219 B2
(45) Date of Patent: Sep. 25, 2007

(54) SUSPENSION ARM AND METHOD FOR MAKING SAME

(75) Inventors: Philippe Michel, Le Plessis Pate (FR); Jean Marc Thirel, Conflans Sainte Honorine (FR); Bernard Trouillas, Le Mans (FR); Jean Veneau, Merize (FR)

(73) Assignee: Auto Chassis International, Boulogne Billancourt (FR)

( * ) Notice: Subject to any disclaimer, the term of this patent is extended or adjusted under 35 U.S.C. 154(b) by 301 days.

(21) Appl. No.: 10/516,934

(22) PCT Filed: Jun. 27, 2003

(86) PCT No.: PCT/FR03/01986

§ 371 (c)(1),
(2), (4) Date: Dec. 14, 2004

(87) PCT Pub. No.: WO2004/002761

PCT Pub. Date: Jan. 8, 2004

(65) Prior Publication Data

US 2005/0225049 A1    Oct. 13, 2005

(30) Foreign Application Priority Data

Jun. 28, 2002  (FR) .................................. 02 08061

(51) Int. Cl.
*B60G 3/18* (2006.01)
(52) U.S. Cl. .................. 280/124.134; 280/124.153
(58) Field of Classification Search ......... 280/124.134, 280/124.135, 124.138, 124.153
See application file for complete search history.

(56) References Cited

U.S. PATENT DOCUMENTS

| 5,516,129 A | 5/1996 | Kurosu et al. |
| 5,607,177 A | 3/1997 | Kato |
| 6,572,126 B2 * | 6/2003 | Tunzini ............... 280/124.134 |

* cited by examiner

*Primary Examiner*—Eric Culbreth
(74) *Attorney, Agent, or Firm*—Oblon, Spivak, McClelland, Maier & Neustadt, P.C.

(57) ABSTRACT

A motor vehicle front suspension arm including three bores corresponding respectively to an articulation of the arm to a wheel support, to a front articulation, and a rear articulation of a hinge formed between the arm and the vehicle body. The suspension arm includes a single-piece sheet metal part and the bores corresponding to the articulations of the hinge have substantially perpendicular axes.

20 Claims, 2 Drawing Sheets

SUSPENSION ARM AND METHOD FOR MAKING SAME

This invention concerns the lower suspension arms placed in front of a vehicle and, in particular, single-sheet "rectangle" type arms.

Arms of this type come in a single part with a mounting area on the steering knuckle and two mounting areas constituting a hinge between the arm and the chassis of the vehicle. The front coupling and the rear coupling of that hinge present appreciably parallel axes. Depending on the vehicles on which the arms must be installed, the two hinge couplings are of horizontal axis or the two hinge couplings are of vertical axis. Such an arrangement does not permit a radial flexibility of the rear coupling of the hinge, commonly called point B. It would, in fact, be necessary to set a large-sized elastic stud in place while that point B is situated in a restricted space.

One of the objectives of the invention is therefore to satisfy these imperatives of flexibility of the hinge coupling, within a context of a single-sheet arm.

In that connection, the invention proposes a front suspension arm of a motor vehicle, containing three bores corresponding respectively to a coupling of the arm to a wheel support, to a front coupling and a rear coupling of a hinge formed between that arm and the chassis of the vehicle.

That suspension arm is characterized in that it is formed by a single sheet metal part and in that the bores corresponding to the hinge couplings have appreciably perpendicular axes.

According to another characteristic of this invention, the centers of the front and rear couplings of the hinge are situated in a same longitudinal plane.

For the purpose of proposing a suspension gear, the space for which is minimal, the center of the front coupling of the hinge is situated in back of a transverse plane passing through the center of the coupling of the arm on the wheel support.

According to one characteristic of this invention, the single part is formed by a stamped sheet presenting a flat center part, a first side connecting the coupling of the arm to the wheel support and the rear coupling of the hinge, a second side connecting the coupling of the arm to the wheel support and the front coupling of the hinge and a third side connecting the two couplings of the hinge.

Making the arm in the area close to the front coupling imposes intense stresses owing to the horizontal orientation of that coupling. With a view to presenting an arm satisfying stress resistance criteria, an appreciably vertical joining plane connects the second side to the periphery of the bore corresponding to the front coupling of the hinge, and an appreciably horizontal joining plane connects the third side to the periphery of that bore.

In order to stabilize the section of the arm in case of braking or longitudinal shock and respectively to stiffen the arm under turning stress, the first side is provided with a vertical wall and the second side is respectively provided with a raised edge, the height of which progressively varies, on which raised edge a dropped edge bears at a right angle, directed toward the outside of the arm.

According to another characteristic of this invention, indexing means are borne by the dropped edge.

According to another characteristic of this invention, means of determining the stable position of the vehicle are borne by the dropped edge.

According to another characteristic of this invention, a groove is formed along the center part of the single part of the arm.

To make possible the mounting and holding of the elastic means ensuring the coupling of the arm on the chassis, within a context of a single-part arm, a flange is made in the uninterrupted connection of the bore corresponding to the front coupling of the hinge, that flange being oriented toward the rear coupling of the hinge. That orientation generates a direction of mounting of the elastic element having to ensure the front coupling of the hinge, that elastic element being mounted with "counter-flange" to ensure better resistance to braking stresses.

The invention also concerns the method of obtaining such a suspension arm, involving the stamping of a single sheet metal part having three couplings with the chassis and a wheel support, characterized in that it consists at least of the formation of a triangular flat surface presenting at two ends a bore of vertical axis, the creation of a raised edge and of a dropped edge borne at a right angle by that raised edge on the side situated between the front coupling of the hinge and the wheel support coupling, the creation of a vertical wall on the side situated between the rear coupling of the hinge and the wheel support coupling, the formation of smooth shapes and joining planes complementing the adjacent sides in order to generate the front coupling of the hinge of appreciably horizontal axis, the creation of a flange in the extension of the bore corresponding to the front coupling of the hinge, in the direction of the rear coupling, and the marking and indexing of the dropped edge.

Other characteristics and advantages of the invention will be apparent on reading the detailed description which follows, for the understanding of which the attached drawings will be referred to, in which.

Figure 1:
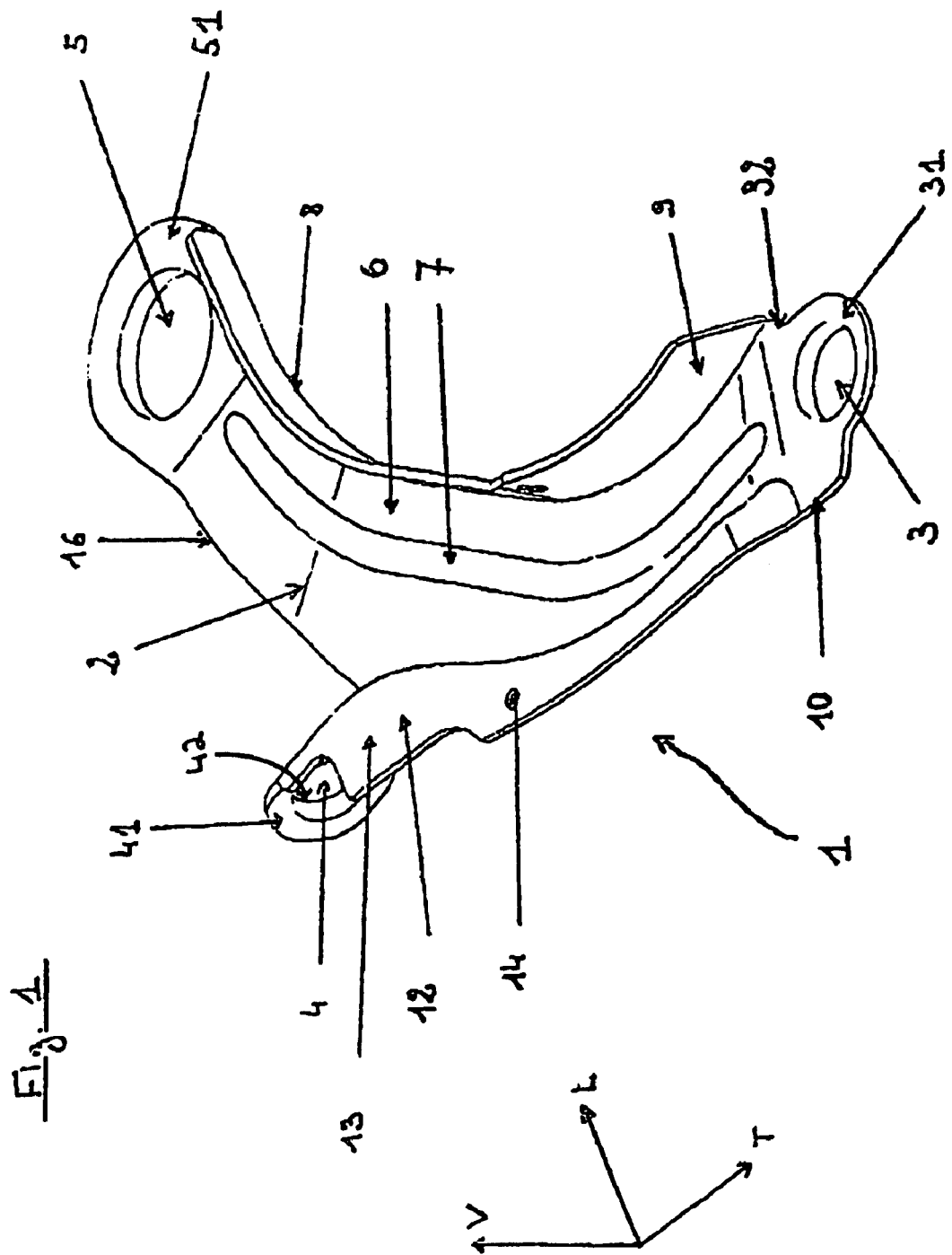
FIG. 1 is a view in perspective of a suspension arm according to the invention.
Figure 2:
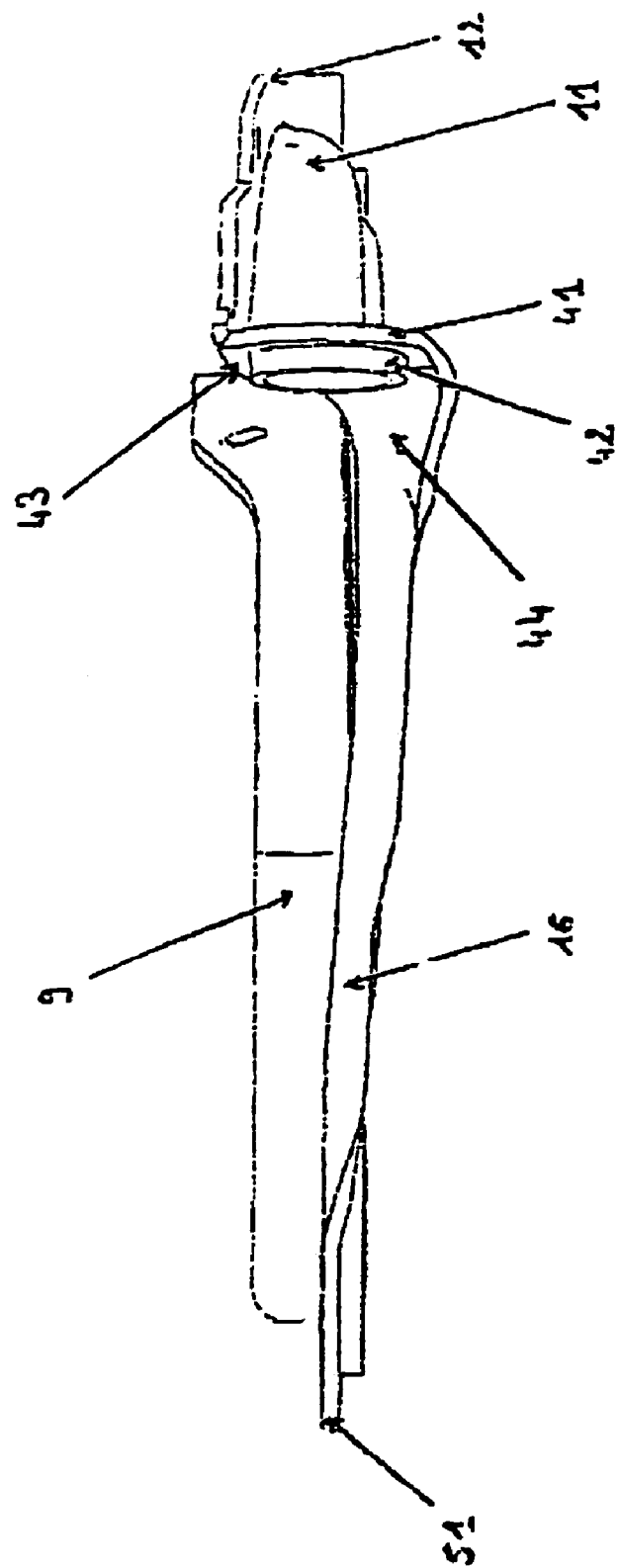
FIG. 2 is a side-face view, from inside the vehicle, of a suspension arm as represented on FIG. 1.

In the description which follows, a longitudinal, vertical and transverse orientation will be adopted on a non-restrictive basis, without limitation, according to the orientation traditionally used in motor vehicles and indicated by the trihedron L, V, T of FIG. 1.

A front lower suspension arm 1, as represented on FIG. 1, consists of a single part 2 connecting the area of coupling 3 on the wheel support and two areas of coupling 4 and 5 forming a hinge between the arm 1 and the chassis of the vehicle. Those three areas form an appreciably right-angled triangle, the hypotenuse of which connects the center of the coupling 3 on the wheel support to the center of the rear coupling 5 of the hinge. The sides of that right-angled triangle are such that the distance between the two centers of couplings 4 and 5, constituting the hinge between the arm and the chassis, is less than the distance between the center of front coupling 4 of the hinge and the center of coupling 3 of the arm 1 on the wheel support, in a ratio of approximately 2/3.

The arm 1 is stamped so as to present at each end of the hypotenuse a bore of vertical axis corresponding on the one hand to the rear coupling 5 of the hinge between the arm 1 and the chassis and on the other to the coupling 3 of the arm 1 on the wheel support. At the end corresponding to the front coupling 4 of the hinge, the arm 1 presents a bore of appreciably longitudinal axis. The two couplings 4 and 5 of the arm 1 on the chassis therefore present appreciably perpendicular axes, the center of each of those couplings being situated in the same longitudinal plane.

The center part 6 of the arm 1 corresponds to an arc joining the two ends 3 and 5 of the hypotenuse, of width greater than the larger diameter of the two bores present at those ends, such as the bore corresponding to the rear coupling 5 of the hinge. The stamped sheet forms around that bore a first coaxial round 51 in the uninterrupted connection of the center part 6 of the arm 1. Likewise, the stamped sheet forms a second coaxial round 31 around the bore corresponding to the coupling 3 on the wheel support, but the diameter of which, less than the first round 51, imparts a recess 32 in relation to the width of the arc-shaped center part 6 of the arm 1.

A groove 7 is made at the bottom of the stamping, along the arc-shaped center part 6. In known manner, such a groove 7 makes it possible, by improving the surface evenness, to avoid creasing of the sheets and the risks of destabilization of the arm 1 when it is subjected to various stresses. Each end of that groove 7 is situated at a distance, predetermined by calculation, from the bores present at the two ends 3 and 5 of the hypotenuse.

A first side 8 is formed by the edge of the arc-shaped center part 6 of the arm 1, situated inside the curve of that arc. This first side 8 is provided with a vertical wall 9. The latter extends from the recess 32 made in proximity to the coupling 3 on the wheel support to the transverse plane passing through the center of the rear coupling 5 of the hinge. Such a wall 9 is dimensioned to best stabilize the section of the arm 1 upon operation of that arm 1 under compression due to a braking or longitudinal shock. As such a situation then entails a considerable rise in stress in that edge 8 directed toward the rear of the vehicle, it is a question of avoiding the buckling of the part 2. The height of that wall 9 can, for example, be 40 millimeters.

A second side 10, situated between the coupling 3 on the wheel support and the front coupling 4 of the hinge, is also provided with a raised edge 11. While the wall 9, symmetrically opposite the groove 7 of the arm 1, is of constant height, the raised edge 11 has a gradually increasing height, from zero height close to the coupling 3 of the wheel support to a height, equivalent to the opposite wall 9, close to the front coupling 4 of the hinge. That raised edge 11, of vertical orientation, bears at its free end a dropped edge 12 at right angle to the raised edge 11 and directed toward the front of the vehicle. That dropped edge 12 thus makes possible a stiffening of the assembly on compression of the arm 1 due to a turning stress, capable of generating a considerable stress between the front link with the chassis and the link to the wheel support. The flat surface it presents also makes possible the integration of different functions. Each suspension arm 1 of the same gear, left and right, thus symmetrically presents, on the one hand, a marking area 13 for the traceability of machined parts and, on the other, a fastening hole 14 for a control rod, necessary to indicate in known manner the stable position of the vehicle and thus regulate the direction of the headlights of the vehicle. The left suspension arm 1 also possesses on that dropped edge 12 a keying slot, not represented, making possible an indexing of the front gear on assembly of the vehicle.

The bore corresponding to the front coupling 4 of the hinge, of appreciably longitudinal axis, is provided on its periphery with a third coaxial round 41. A flange 42, made by stamping and oriented toward the rear of the vehicle, is borne by that third round 41 in the uninterrupted connection of the corresponding bore. The center of the front coupling 4 of the hinge is set back from the transverse plane passing through the center of the coupling 3 on the wheel support. For example, a recess of 70 millimeters makes it possible to obtain a more compact and therefore less cumbersome arm.

Owing to the geometric characteristics of the embodiment of the arm 1 described above, the front coupling 4 of the hinge is situated outside the circle defined by the arc-shaped center part 6 of the arm 1.

The upper part of the third coaxial round 41 therefore extends in an appreciably transverse plane to the junction of the raised edge 12. The joining plane 43 thus formed is situated in a vertical plane.

The lower part of the third coaxial round 41 extends in an appreciably longitudinal plane to the junction of a third side 16 defined by the arc-shaped center part 6 between the two couplings 4 and 5, constituting the hinge. The joining plane 44 thus formed is situated in a horizontal plane.

Obtaining of the arm 1 by stamping makes it possible to obtain in that area even profiles passing from a vertical section to a horizontal section smoothly. Stamping also makes it possible to obtain a flange 42 without a then welded gusset. The arm 1 then comes entirely within a single-piece context and makes possible a fitting of the elastic element, ensuring the front coupling 4 of the hinge with "counter-flange", that is, a fitting toward the front of the vehicle, while the flange 42 is oriented toward the rear coupling 5 of the hinge. That type of fitting makes possible a better resistance to braking stresses.

This arrangement around the front coupling 4 of the hinge necessitates reducing the longitudinal stresses at that coupling point. The appreciably perpendicular arrangement—in the hinge formed between the arm 1 and the chassis—of the rear coupling 5 in relation to the front coupling 4 makes it possible to increase the longitudinal stress contribution of the point corresponding to the rear coupling 5 of the hinge. For example, on braking, there is the equation:

$$\vec{F}_{xE} = -\Sigma(\vec{F}_{xA} + \vec{F}_{xB})$$

Wherein $F_{xE}$ represents the force (F) in the x-direction (longitudinal) at the wheel coupling (point E) during braking. The magnitude of this force, $F_{xE}$, is equal to the magnitude of the sum of the forces applied to the front and rear couplings. $F_{xB}$ represents the force (F) acting in the x-direction (longitudinal) at the rear coupling (point B) and $F_{xA}$ represents the force (F) acting in the x-direction (longitudinal) at the front coupling (point A). The possibility of rendering the rear coupling point 5 of the hinge stiffer makes possible an increase of $F_{xB}$ and therefore, depending on the constancy of $F_{xE}$, a reduction of $F_{xA}$.

Such a single-sheet suspension arm 1 is the result of a particular method of stamping capable of obtaining an arm 1, on the one hand, in that particular geometry where the front coupling 4 and rear coupling 5 of the hinge formed between the suspension arm 1 and the chassis of the vehicle are of appreciably perpendicular axis and, on the other hand, validated in terms of stiffness and stress resistance, notably in case of braking or turning, and without resorting to a multiple part technology. It is advisable to work the joining plane 43 between the dropped edge 12 and the part of the arm situated in proximity to the front coupling 4 of the hinge to ensure a smooth shape. It is also advisable to work the joining plane 44 between that part of the arm and the arc-shaped center part 6 of the arm 1 to ensure a smooth shape. Smooth shapes make it possible not to generate too many stresses on passage between vertical and horizontal section planes.

The invention is not at all limited to the embodiment described and illustrated, which has been given only by way of example.

The invention claimed is:

1. A front suspension arm of a motor vehicle, comprising:
   three bores, including
      a wheel coupling configured to couple the arm to a wheel support, and
      a front coupling and a rear coupling configured to couple the arm to a hinge formed between the arm and a chassis of the vehicle; and
   an arc-shaped center part, including
      a first side connecting the wheel coupling and the rear coupling,
      a second side connecting the wheel coupling and the front coupling, and
      a third side connecting the front coupling and the rear coupling; and
   a vertical wall along the first side, extending above the center part, wherein the arm is a single sheet metal part, and bores corresponding to the front coupling and the rear coupling have appreciably perpendicular axes.

2. A suspension arm according to claim 1, wherein centers of the front coupling and the rear coupling are situated in a same longitudinal plane.

3. A suspension arm according to claim 1, wherein a center of the front coupling is situated in back of a transverse plane passing through a center of the wheel coupling of the arm.

4. A suspension arm according to claim 1, further comprising:
   an appreciably vertical joining plane connecting the second side to a periphery of the bore corresponding to the front coupling.

5. A suspension arm according to claim 1, further comprising:
   an appreciably horizontal joining plane connecting the third side to a periphery of the bore corresponding to the front coupling.

6. A suspension arm according to claim 1, wherein the second side is provided with a raised edge, a height of which gradually varies.

7. A suspension arm according to claim 6, wherein the raised edge extends above an entirety of the center part.

8. A suspension arm according to claim 1, wherein a raised edge of the second side bears a dropped edge at a right angle, directed toward an outside of the arm.

9. A suspension arm according to claim 8, wherein the dropped edge is configured to receive indexing bores.

10. A suspension arm according to claim 8, further comprising:
    means for receiving a means for determining a stable position of the vehicle.

11. A suspension arm according to claim 8, wherein the dropped edge extends above an entirety of the center part.

12. A suspension arm according to claim 1, further comprising:
    a groove formed along the center part of the arm.

13. A suspension arm according to claim 12, wherein the groove is an arc-shaped groove.

14. A suspension arm according to claim 1, further comprising:
    a flange uninterruptedly connected to the bore corresponding to the front coupling,
    wherein the flange is oriented toward the rear coupling.

15. A suspension arm according to claim 1, wherein the vertical wall extends from a recess in proximity to the wheel coupling to a traverse plane passing through the center of the rear coupling.

16. A suspension arm according to claim 1, wherein the vertical wall is configured to stabilize the suspension arm during a longitudinal shock.

17. A suspension arm according to claim 1, wherein the vertical wall extends above an entirety of the center part.

18. A suspension arm according to claim 1, wherein the vertical wall and the first side have an arc shape.

19. A suspension arm according to claim 1, wherein the third side is free of a vertical wall extending above the center part.

20. A method of obtaining a motor vehicle suspension arm, comprising:
    forming a triangular flat surface from a single sheet metal part;
    boring a bore with a vertical axis at two ends of the triangular flat surface;
    creating a raised edge, and a dropped edge at a right angle to the raised edge, on a side situated between a front coupling and a wheel coupling,
    creating a vertical wall on a side situated between a rear coupling and the wheel coupling,
    generating a front coupling with an appreciably horizontal axis from a joining plane,
    creating a flange in an extension of a bore corresponding to the front coupling, in a direction of the rear coupling.

* * * * *